Feb. 21, 1961   J. W. WALLACE ET AL   2,972,269
AUTOMATIC STRIP THICKNESS CONTROL APPARATUS
Filed April 8, 1957

United States Patent Office 2,972,269
Patented Feb. 21, 1961

2,972,269
AUTOMATIC STRIP THICKNESS CONTROL APPARATUS

John W. Wallace, Orchard Park, and Robert E. Hull, Amherst, N.Y., and Raymond W. Moore, Whitehall, Pa., assignors to Westinghouse Electric Corporation, East Pittsburgh, Pa., a corporation of Pennsylvania Filed Apr. 8, 1957, Ser. No. 651,386

9 Claims. (Cl. 80—35)

The present invention relates, in general, to automatic control apparatus for one or more motors, and more particularly relates to automatic control apparatus for controlling the operation of one or more of the motors of a rolling mill operative to determine the thickness or gauge of a continuous strip of material, such as, steel or some other material.

It is an object of the present invention to provide an improved motor control apparatus, and more particularly to provide an improved motor control apparatus for controlling the operation of one or more motors driving a rolling mill for a strip of material or the like to thereby control the gauge or thickness of that strip of material.

It is another object to provide an improved control apparatus for controlling the motors of a rolling mill for a strip of material which apparatus is responsive to any error or deviation in the thickness of said strip relative to a predetermined desired thickness for providing a first and very rapid corrective control action to the rolling mill for removing the major portion of said thickness error and, in addition, for providing a second and slower corrective control action to the rolling mill for removing the remaining portion of said thickness error.

It is a different object of the present invention to provide an improved control apparatus for a material strip rolling mill which control apparatus is operative to correct any error in strip thickness or gauge relative to a predetermined thickness or gauge by controlling the tension of the strip up to a predetermined maximum value of strip tension, and to make any additional and necessary corrections for thickness errors by changing the spacing or screw-down pressure of the roller members of the rolling mill.

It is an additional object of the present invention to provide an improved control apparatus for a material strip rolling mill for correcting strip gauge or strip thickness errors relative to a predetermined strip thickness, which apparatus includes a fast acting first control apparatus operative as a predetermined proportion of the amount or magnitude of thickness error, and a slower acting second control apparatus that operates as a predetermined integral of the actual thickness error.

It is a further object of the present invention to provide an improved control apparatus in accordance with the above object with the slower acting second control apparatus not being provided until a predetermined amount of thickness error is present.

These and other objects and advantages of the present invention will become apparent in view of the following description taken in conjunction with the drawings, wherein:

Fig. 5, including views 5A and 5B together, shows an electrical schematic view of one form of the present control apparatus;

Figure 1:
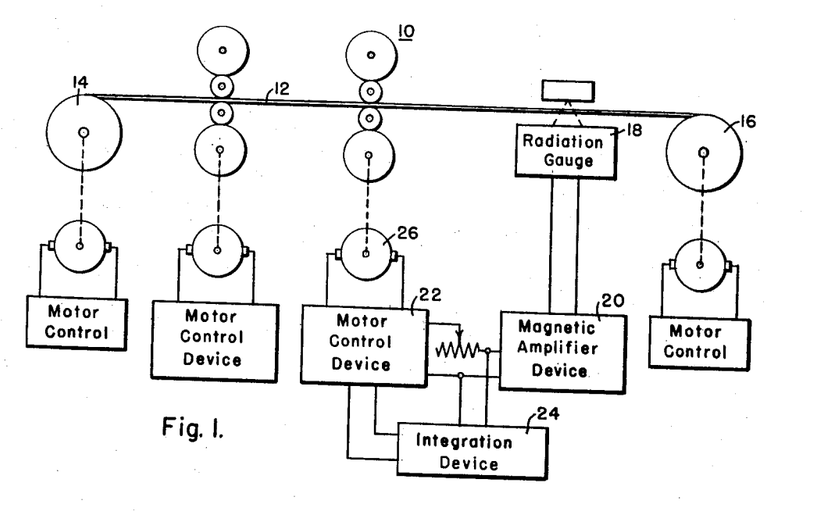
Figure 1 is a diagrammatic view of control apparatus in accordance with the teachings of the present invention.

In Fig. 1 there is shown one stand 10 of a rolling mill operative with a strip of material 12 passing from an entry reel 14 and a previous stand 15 to a delivery reel 16. Each of the latter entry reel 14, and previous stands and the delivery reel 16 has its own motors and motor controls, as well known to persons skilled in this art, for controlling the tension of the strip 12 passing through the rolling mill. A radiation type of thickness gauge 18 is provided and is operative as well known to persons skilled in the art to provide an output signal having a magnitude which varies as a direct function of the amount of strip thickness error or thickness difference between the actual thickness of the strip 12 passing through the radiation gauge 18 and a predetermined desired thickness of the strip 12. The polarity of the output signal from the radiation gauge 18 depends upon whether the actual thickness of the strip 12 is greater than the predetermined desired thickness or is less than the predetermined desired thickness of the strip 12. The control signal from the radiation gauge passes through a magnetic amplifier device 20 or other suitable type of amplifier device where it is amplified and passed to the input of a motor control device 22 and to the input of an integration device 24. The output of the integration device 24 is also supplied to the motor control device 22 such that the output error correction control signal from the motor control device 22 is connected to control the operation of a motor 26 which drives the stand 10 of the rolling mill and determines the operative speed of the stand 10.

Figure 2:
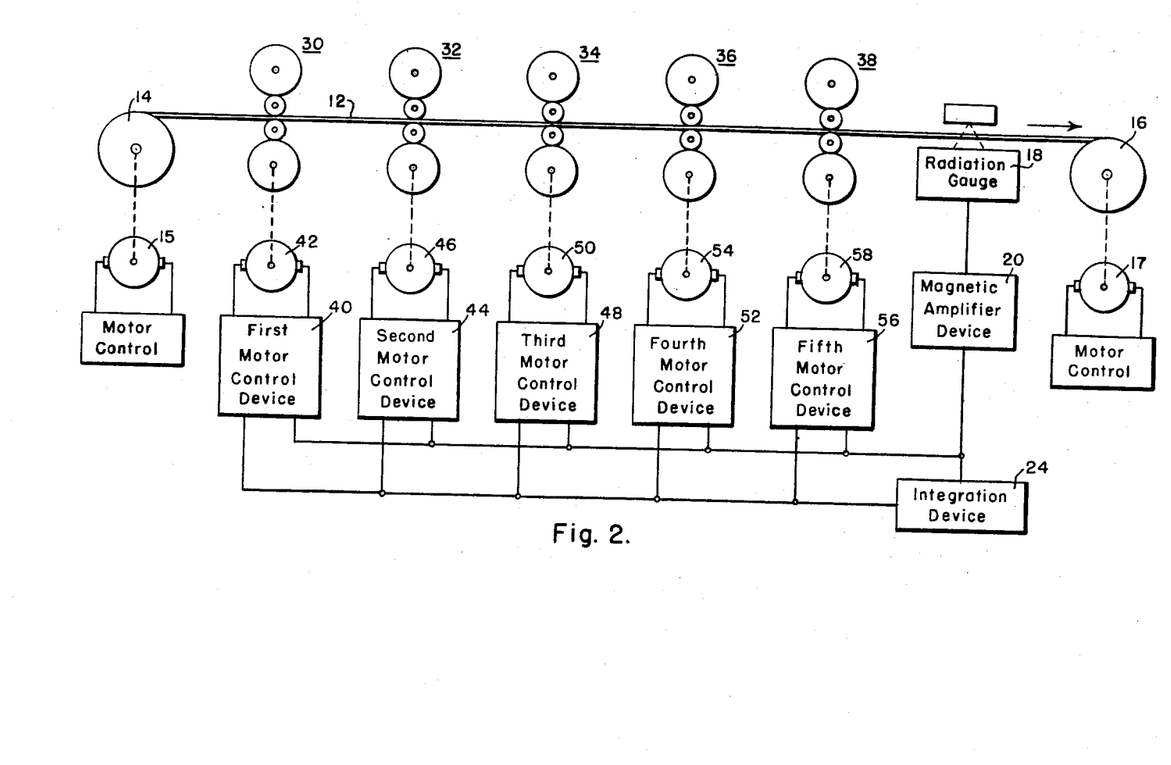
Fig. 2 is a diagrammatic view of a second modification of the control apparatus in accordance with the teachings of the present invention.

In Fig. 2 there is shown a five stand rolling mill operative with a strip of material 12 passing from the entry reel 14 controlled by its motor 15 and a delivery reel 16 controlled by its respective motor 17. The strip 12 passes from the entry reel 14 through the roller members of a first stand 30, then through the roller members of a successive stand 32, then through the third stand 34, then through the fourth stand 36, and finally, through the fifth stand 38, as well known to persons skilled in this particular art. The thickness of the strip 12 passing from the fifth stand 38 to the delivery reel 16 is measured by a radiation gauge 18 having an output signal which varies in magnitude as a direct function of the magnitude of error between the actual thickness of the strip and a predetermined desired thickness for the strip 12 and having a polarity which is determined by the actual thickness of the strip being greater than or less than the predetermined desired thickness for the strip 12. The output signal from the radiation gauge 18 passes through a suitable amplifier device such as the magnetic amplifier device 20, and is then supplied to one input of respective motor control devices provided for the respective motors for each of the stands of the rolling mill. More specifically, the amplified control signal from the magnetic amplifier device 20 passes to one input of the first motor control device 40 operative to control the operation of the motor 42 and thereby the operating speed of the first stand 30. Similarly, this same control signal is supplied to one input of a second motor control device 44 operative to similarly control the operation of a motor 46 that is operative with the second stand 32 of the rolling mill. Similarly, this amplified control signal is supplied to one input of the third motor control device 48 operative to control the operating speed of a motor 50 to, in turn, control the operation of the third stand of the rolling mill. Similarly, this amplified control signal is supplied to one end of a fourth motor control device 52 operative to control the operation of a motor 54 for controlling the operating speed of a fourth stand of the rolling mill, and finally, this same amplified signal is supplied to one input of a fifth motor control device 56 for controlling the operation of the motor 58 connected to control the operating speed of the fifth stand 38. This same amplified control signal from the radiation gauge 18 is supplied from the magnetic amplifier device 20 to an integration device 24, from which it is supplied to a second input of each of the motor control devices for the respective motors for each stand of the rolling mill as shown in Fig. 2. In this regard, it may be noted that each of the motor control devices may include a magnetic amplifier device with the illustrated two-input signals being supplied to separate control windings of this magnetic amplifier device in an additive manner, such that each of the latter two input signals for each motor control device has the same polarity and has the same effect relative to the operating speed of the respective stand being controlled.

Further it should be noted that by providing suitable series impedance members in the circuit of each of the windings for the respective magnetic amplifier devices of each motor control device, it may be desirable to vary the effect that the applied input signals to the respective motors may have such that the control signal from the radiation gauge 18 has the greatest effect upon the closest stand, namely, the fifth stand 38, and has a decreasing effect in perhaps a linear relationship or other relationship as may be desired on the operation of the other stands in succeedingly further distances away from the radiation gauge such that the least control effect is provided to the first stand 30.

Further it may be desirable to limit the amount of speed correction and thereby the amount of strip tension variation that may be effected by each of the respective stands to thereby limit the maximum tension in the strip 12 at any of its locations, and in particular, to limit the maximum tension between the fifth stand and the delivery reel 16 as will be later described.

Further, it may be desirable to reverse the polarity of the control windings of the motor control drive for the first stand, for example, and apply a zero error correction voltage to the second stand with the above control operation with the other stands. Or, it may be desirable to reverse the polarity of the control windings of the motor control devices for the first, second and third stands, and not reverse the polarity of the control windings for the fourth and fifth stands; or other readily evident control arrangements may be provided. Thusly, a very flexible and adaptable control apparatus has been provided in accordance with the teachings of the present invention.

Figure 3:
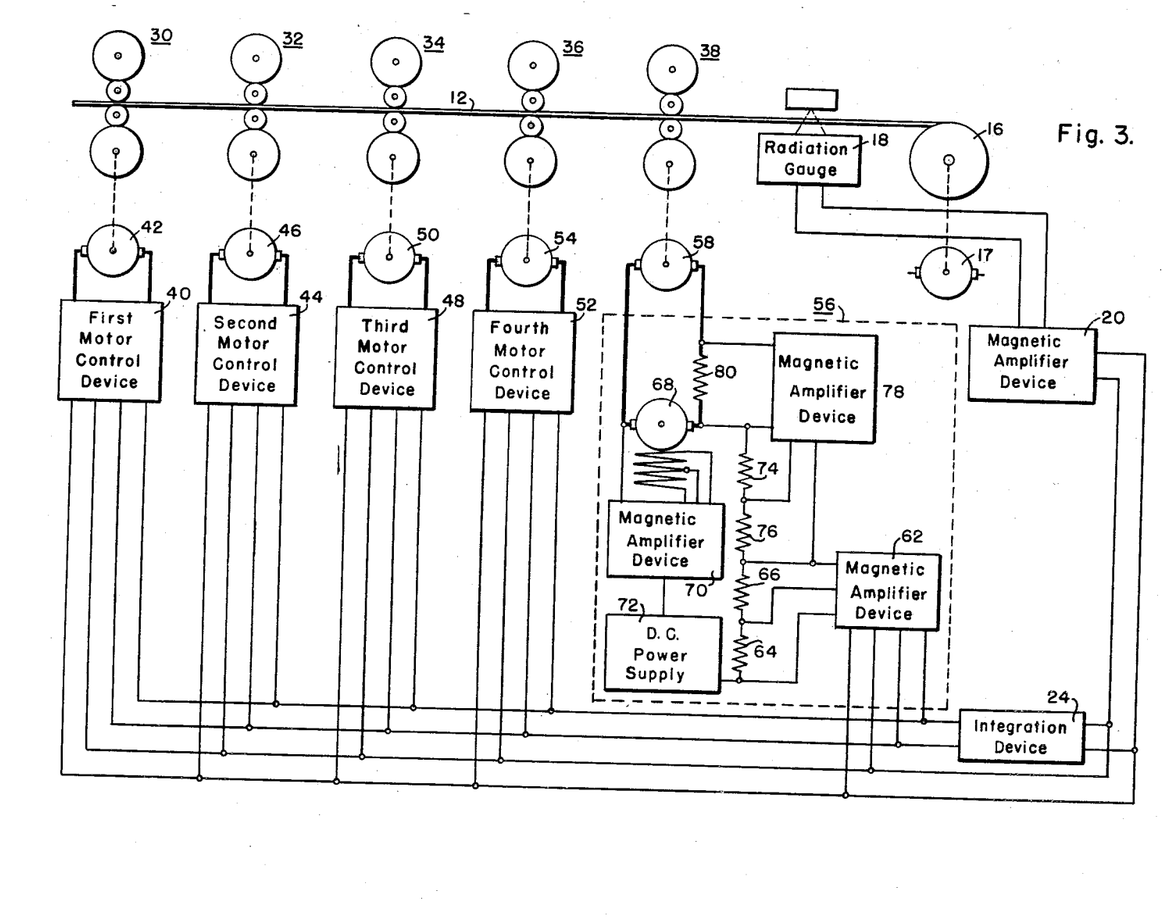
Fig. 3 is an electrical schematic view of the control apparatus in accordance with the teachings of the present invention.

In Fig. 3 there is provided a more detailed schematic showing of the control apparatus as shown in Fig. 2, and in particular a more detailed showing of the fifth motor control device 56 being as an example of the form of motor control devices suitable for the respective motors of the stands of the rolling mill. In Fig. 3 the components similar to those shown in Fig. 2 have been identified with similar numerals.

Figure 4:
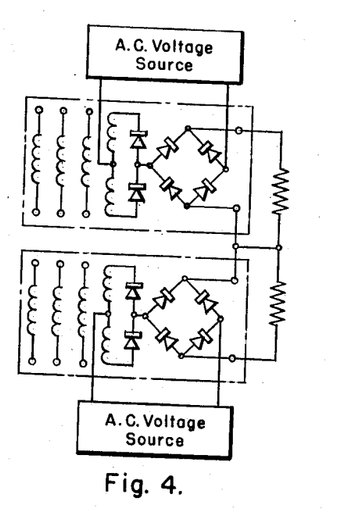
Fig. 4 is a schematic view of a well-known magnetic amplifier push-pull connection arrangement suitable for use with the present control apparatus.

As shown in Fig. 3 the output control signal from the radiation gauge 18 passes through the magnetic amplifier device 20 and onto one winding of a magnetic amplifier device 62. The output of the integration device 24 passes onto a second control winding of the magnetic amplifier device 62. The output or load windings of the magnetic amplifier device 62 are connected in a push-pull arrangement, as shown in Fig. 4 and as well known to persons skilled in this art, across the impedance members 64 and 66. The latter impedance members 64 and 66 are connected in a series control circuit including the supply generator 68 for the fifth stand motor 58, a control winding of the magnetic amplifier device 70, a regulated direct current power supply 72, and the impedance members 74 and 76. The latter impedance members 74 and 76 are connected in a push-pull arrangement with the output load windings of the magnetic amplifier device 78, having one of its control windings energized by the voltage drop across the impedance member 80 connected in the series power supply circuit between the generator 68 and the fifth stand motor 58. The latter impedance member 80 is therefore operative to provide an IR compensation feedback signal for controlling the operation of the supply generator 68, by providing said IR compensation feedback signal across the series connected impedance members 74 and 76.

In Fig. 4 there is shown a magnetic amplifier push-pull circuit arrangement for the output or load windings, as well known to persons skilled in this art, and is suitable for use in the present control apparatus. The output terminals of the magnetic amplifiers are shown in other figures of the drawings, and not the load windings, for simplicity of illustration.

Figure 5A:
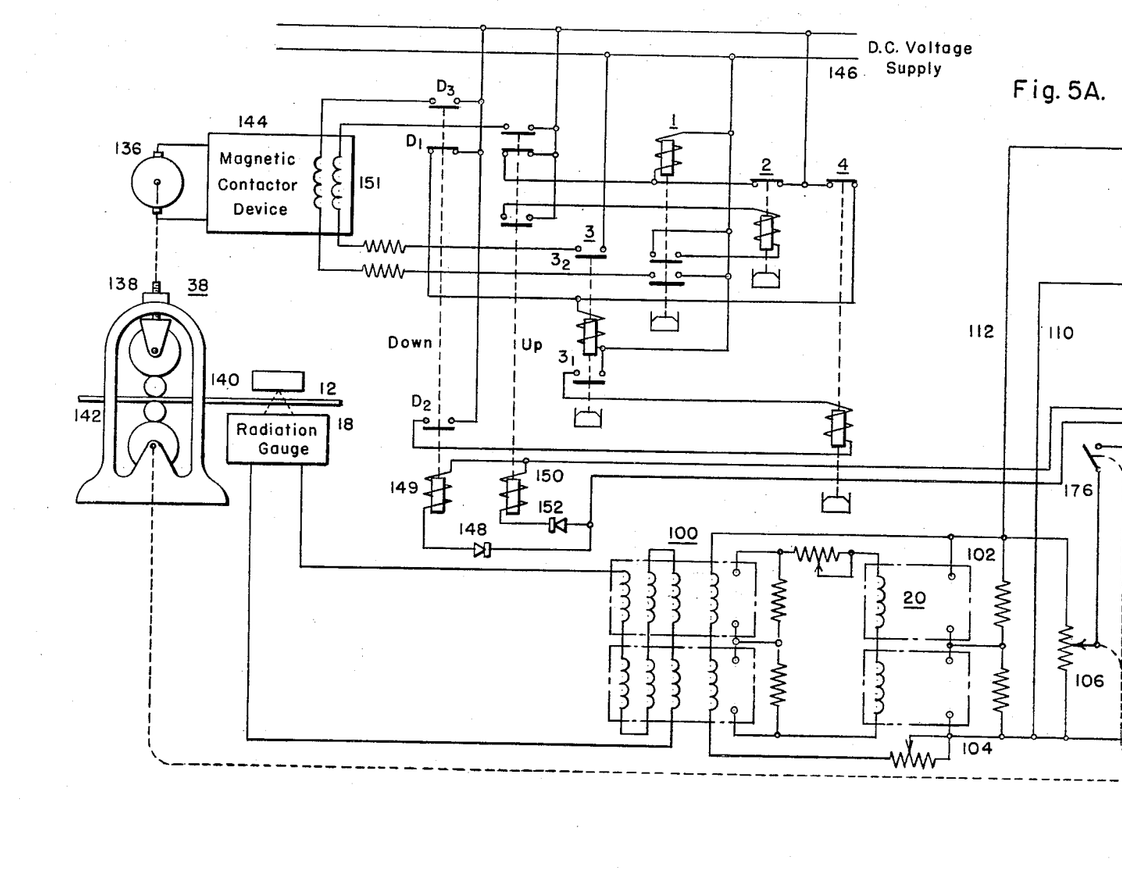
Figure 5B:
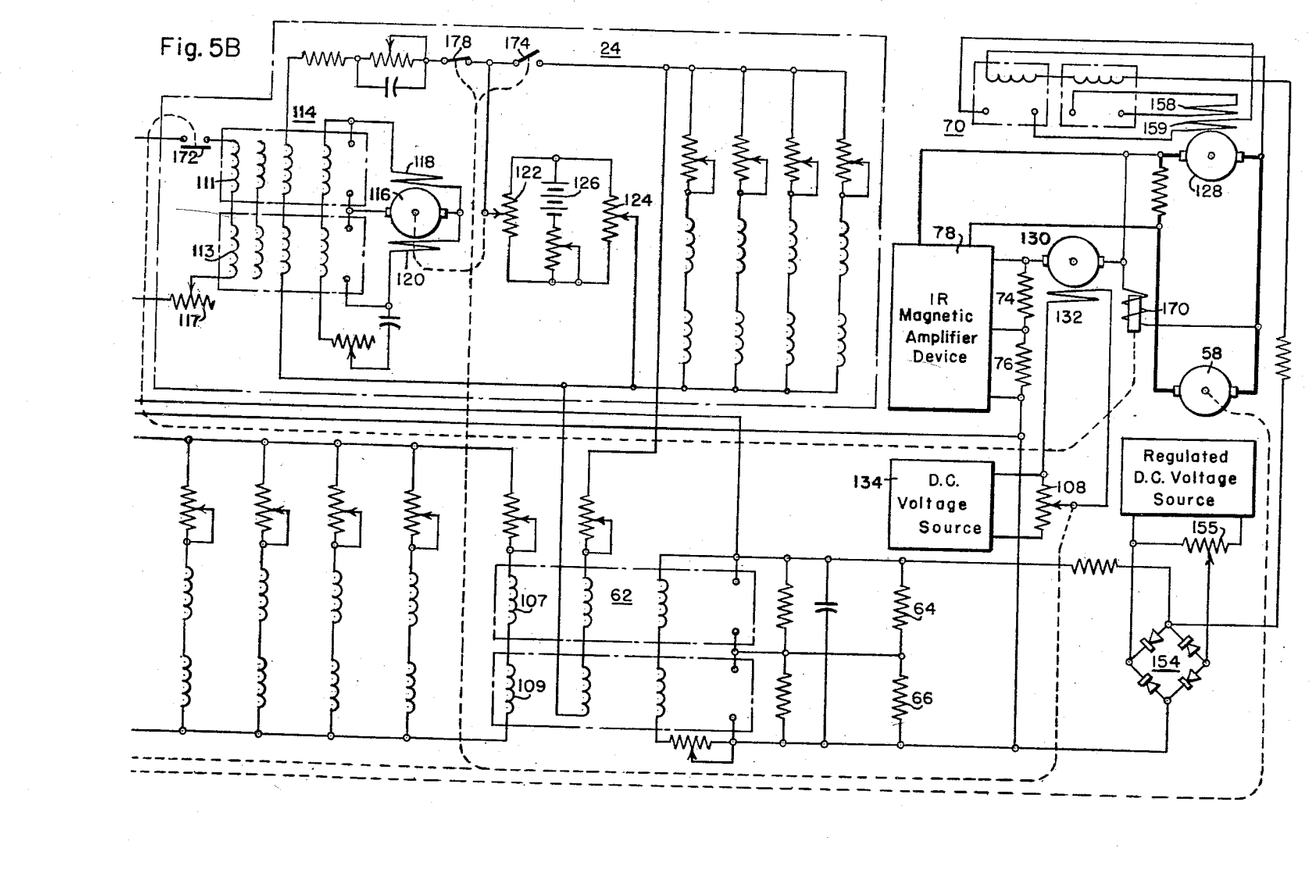
Figure 6:
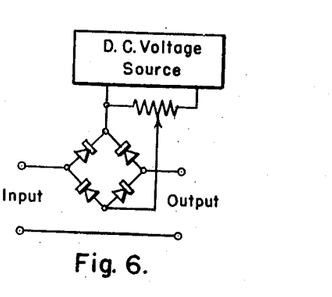
Fig. 6 is a schematic view of a well-known and suitable dead-band device.
Figure 9:
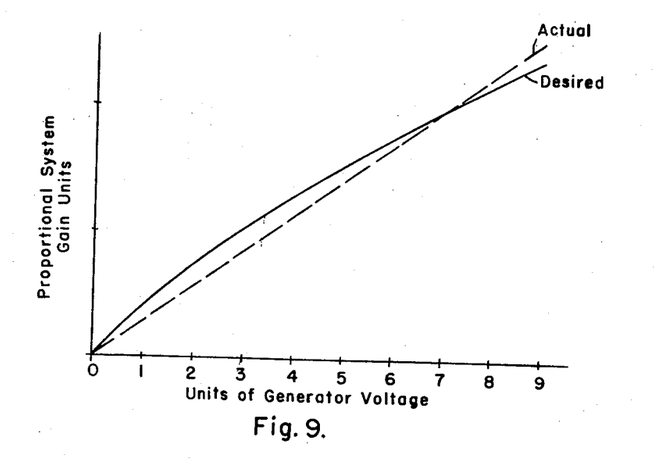
Fig. 9 is a curve chart illustrating the operation of the proportional control system of the present invention.

In Fig. 5 there is shown one form of the control apparatus in accordance with the teachings of the present invention, and in greater detail relative to the particular control operation of the motor 58 for the fifth stand 38 of the rolling mill. The output control signal from the radiation gauge 18 is supplied to the control windings of a preamplifier device shown as a magnetic amplifier 100. The output or load windings of the magnetic amplifier 100 are connected in a push-pull arrangement to the control windings of the magnetic amplifier device 20, with the output or load windings of the latter magnetic amplifier device 20 being connected in a push-pull arrangement across a pair of resistors 102 and 104 which, in turn, are connected across a parallel connected gain calibration potentiometer 106. A potentiometer device 108 is operative to control the general operating speed of the rolling mill and the moving speed of the strip 12. It is interconnected as shown to vary the position of the output arm of the gain calibration potentiometer 106, such that the output error correction signal from the potentiometer 106 is applied as a function of mill speed as shown in Fig. 9 to a control winding of a magnetic amplifier device in each of the motor control devices for the first and the second stand, the third stand and the fourth stand 36, with the magnetic amplifier device 62 of the fifth stand 38 shown. In series with each of these control windings is an individual gain calibration impedance device.

The output control signal from the radiation device 18 is sensed by the conductors 110 and 112 connected across the impedance devices 102 and 104 as shown in Fig. 5. These conductors energize a control winding of a magnetic amplifier device 114 through a suitable gain calibration impedance device 117. The output or load windings of the magnetic amplifier device 114 are connected in a push-pull arrangement through the armature circuit of a control motor 116 and the forward operation field winding 118 and the reverse operation field winding 120 of the motor 116. The motor is operative thereby to vary the position of a contact arm on a potentiometer 122 connected in a bridge circuit with a second potentiometer 124 and energized by a direct current voltage source 126, such that dependent upon the position of the contact arm of the potentiometer 122, an integrated control signal having a magnitude and a polarity dependent upon the position of the contact arm of the potentiometer 122 is applied to a second control winding of each of the magnetic amplifier devices in the respective motor control devices for the first through the fifth stands, with suitable gain calibration impedance devices being provided, as shown. The magnetic amplifier device for the fifth stand is the magnetic amplifier device 62, such that the output or load windings of the magnetic amplifier device 62 are connected in a push-pull circular arrangement to energize the impedance members 64 and 66 previously shown in Fig. 3.

The power supply generator 128 for the motor 58 of the fifth stand 38 has its armature circuit energized by a direct current power supply including a reference exciter generator 130 having a control field 132 energized by the potentiometer 108 as energized by a direct current voltage source 134. The latter generator 130 is connected in series with the IR compensating feedback impedance devices 74 and 76 energized by the IR magnetic amplifier device 78, such that the output voltage of the reference exciter 130 is combined with the voltage drop across the IR compensating impedance devices 74 and 76 and combined with the voltage drop provided across the control impedances 64 and 66 to thereby determine the energization of the control windings of amplifier device 70 and thereby the generator armature for the generator 128. This determines the output voltage of the generator 128, and thusly the operating speed of mill stand 38.

Figure 7:
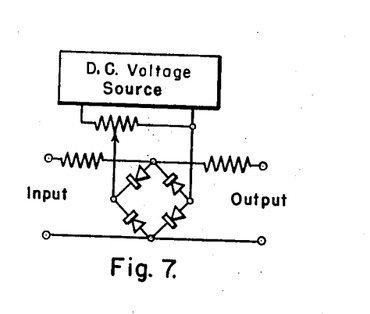
Fig. 7 is a schematic view of a well-known and suitable limiter device.

A screw-down control motor 136 is provided for a screw-down control device 138 operative to determine the spacing between the roller members 140 and 142 of the fifth mill stand 38. A well-known magnetic contactor device 144 controls the operation and rotational direction of the screw-down motor 136 to either increase or decrease the spacing between the roller members 140 and 142. The control windings of the magnetic contactor device 144 are energized by the control circuit as shown in Fig. 5, from a suitable direct current voltage supply 146, as will be later explained. The "up" and "down" relay control windings for the control circuit for the magnetic contactor device 144 are connected across the impedance members 64 and 66, such that the "down" operation control winding 149 to decrease the spacing between the roller members 140 and 142 is shown connected in series with the rectifier device 148, and the "up" control winding 150 operative to control the screw-down motor 136 to increase the spacing between the roller members 140 and 142 is shown connected in series with the rectifier device 152. A voltage limiter device or circuit, as shown in Fig. 7, is provided for limiting the maximum voltage drop that can build up across the series connected impedance devices 64 and 66, and to thereby limit the maximum strip tension that can build up in the strip 12 relative to the fifth stand 38. The voltage limiting device includes a rectifier bridge circuit 154 with its alternating current terminals connected across the impedance devices 64 and 66 and having its direct current terminals connected across a variable potentiometer 155 connected across a regulated direct current voltage source having an output voltage in the order of 60 volts. Thusly, the potentiometer 155 may be regulated to limit the maximum voltage which can build up across the impedance members 64 and 66 to a voltage in the order of plus or minus 30 volts. The input or control windings of a magnetic amplifier device 70 are energized by a signal corresponding to the difference between the output voltage of the supply generator 128 on the one hand and the summation of the output voltage of the reference exciter generator 130, the IR feedback compensating voltage across the impedance members 74 and 76 and the error corrective control signal applied across the impedance devices 64 and 66, to thereby control the energization of the control fields 158 and 159 for the generator 128 by the output or load windings of the magnetic amplifier device 70.

Thusly, it will be seen that automatic control of delivery end strip thickness or gauge is accomplished by a plurality of control systems which all work together as one system, such that a proportional system controls the tension of the strip by applying the output error correction signal from the radiation gauge 18 through the gain recalibrating potentiometer 106 and applied to the control windings 107 and 109 of the magnetic amplifier device 62 for the fifth stand, as well as the respective control windings of the magnetic amplifier devices for each of the other stands as shown in Fig. 5. This control signal is then applied across the impedance devices 64 and 66 and is operative to control the energization of the mill stand motor 58 by controlling the output voltage of the supply generator 128 in accordance with the error correction control signal received from the radiation gauge 18. The second control signal is the integral tension control signal and is supplied by the integrator device 24, whereby an error correction signal is received from across the impedance devices 104 and 102 and is applied through conductors 110 and 112 to control the operation of the servo motor 116 to apply to the control windings 111 and 113 of the magnetic amplifier device 114 an integrated error corrective control signal. The third control system is the automatic screw-down jogging control system including the magnetic contactor device 144, and its associated control circuitry, for controlling the operation of the screw-down motor 136 and thereby jogging or varying the spacing between the roller members 140 and 142 to correct for errors in strip thickness or gauge greater than those which can be safely corrected as predetermined by setting the tap on the potentiometer 155 of the voltage limiting control for correction by varying the tension of the strip 12.

When an error in strip thickness or gauge appears or is present, the radiation gauge 18 detects it and provides a control voltage proportional to this thickness error. This control voltage is impressed on the input winding of the preamplifying magnetic amplifier device 100 having a function to build up the power level of the error control signal and may have a voltage gain of the order of two, such that the output of the magnetic amplifier device 100 is proportional to the thickness or gauge error in the ratio of about 5 volts per mil of error. The error control signal from the magnetic amplifier device 100 is then impressed on the control windings of a second magnetic amplifier device 20 called the automatic gauge control magnetic amplifier device which has a higher output rating since it is required to supply the error correction signal to several inputs of the various magnetic amplifier devices for the respective stands of the rolling mill. The effective gain of the magnetic amplifier device 20 may be in the order of about ten, such that its output error signal has a value of approximately 50 volts per mil of thickness or gauge error. This error control voltage is applied to a gain recalibration potentiometer 106 and to the integrator device 24. The error correction control voltage taken from the recalibration potentiometer 106 is supplied to one control winding of each of the magnetic amplifier devices for the various stands that are to be controlled, which are referred to as the stand magnetic amplifier devices and the output of each feeds an error corrective signal into the reference circuit of the main drive motor control device of its respective stand, which motor control device is well known to persons skilled in this art. The gain of the respective stand amplifier devices will probably be different for the various stands and should be set for optimum overall operation of the control system. The gain may be changed by the potentiometer device connected in series with each of the input windings. The signal from the recalibration potentiometer 106 may be referred to as the proportional error correction signal.

The error voltage applied to the integrator magnetic amplifier device 114 causes it to provide an output voltage having a magnitude corresponding to the magnitude of the thickness error relative to a predetermined thickness and having a polarity corresponding to whether the actual thickness of the strip is less or greater than the predetermined desired thickness to thereby cause the servo motor 116 to run in the corresponding direction to vary the position of the contact arm of the potentiometer 122 in the bridge circuit with the potentiometer 124 and the voltage supply 126, such that an output control signal is provided representing the unbalanced voltage caused by the motor 116 moving the contact arm of the potentiometer 122, which output control signal may be referred to as the integrated error control signal.

The latter integrated control signal is supplied to a second control winding of each of the stand magnetic amplifier devices, and for the stand five magnetic amplifier device 62 is supplied to the control windings 111 and 113. The gain of the respective stand amplifier devices relative to the integrated error control signal may be varied by the potentiometers connected in series with the respective control windings.

Each stand magnetic amplifier device now has two input signals applied to it, one being from the proportional system and one from the integrating system, with the gain setting of each stand magnetic amplifier device being independent of the other stands as may be desired, and with the proportional correction signal and the integrated correction signal being additive to cause the delivery strip thickness or gauge to change in the same direction as may be desired toward the predetermined desired thickness from the actual thickness. In other words, the action of the proportional control signal and the action of the integrated control signal are additive and not differential.

There is one important difference between the thickness correction action of the proportional system as compared to the corrective action of the integrating system. The proportional system requires that a small error be maintained at the output of the magnetic amplifier device 20 and across the impedance members 102 and 104 for its corrective action to be continuous. The integrating system will maintain its output even if the output of the magnetic amplifier device 20 goes to zero. In fact, the corrective action of the integrating system will continue to increase until this error voltage does go to substantially zero. Therefore, the action of the integrating system is such as to cause the thickness or gauge error of the strip to go substantially to zero and to hold it there continuously. Thusly, the corrective action of the proportional system will go to zero in effect as the integrating system takes over the corrective action, with the proportional system acting faster and removing the greater portion of the thickness error before the integrating system can respond. However, the integrating system then follows up and relieves the proportional system and reduces the thickness error essentially to zero.

The strip thickness or gauge is thereby changed by the error corrective signal below a predetermined level as controlled by the voltage limiting circuit including the rectifier bridge 154 and the potentiometer 155 to cause the speed of the respective mill stands to change and thereby vary the tension of the strip 12 as required to correct the delivery strip thickness. For error corrective signals above the predetermined level as determined by the latter voltage limiting circuit, the screw-down device 138 is jogged by the screw-down motor 136 to vary the spacing between the roller members 140 and 142. The proportional control system and the integrating control system are both closed loop systems with the permissible gains of their respective systems being dictated by stability requirements. The stability is affected greatly by the movement speed of the strip. The strip speed affects the time of travel of the strip from the mill stands, or point of thickness error correction, to the location of the radiation gauge 18 for measuring the strip thickness. On the proportional system the gain setting possible has been determined as shown in Fig. 9 to be nearly proportional to line speed and is adjusted linearly by the gain recalibration potentiometer 106 which follows the motor operated potentiometer 108 for the rolling mill which, in turn, is operated to control the movement speed of the strip 12 through the mill.

Figure 8:
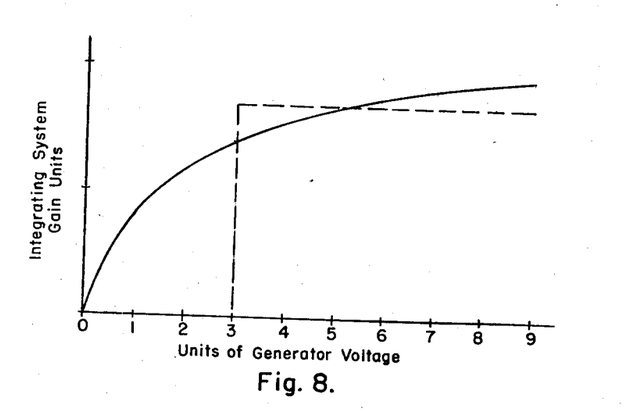
Fig. 8 is a curve chart illustrating the operation of the integration device 24.

The gain of the integrating system can be constant for normal rolling speeds, but should drop rapidly for lower speeds and therefore as shown in Fig. 8, the system loop is opened below a predetermined speed setting such that the proportional system can then take over the complete thickness error correction operation for the lower operating speeds.

The operating speed of the rolling mill is proportional to the output voltage of supply generator 128. Therefore, relay control device 170 as shown in Fig. 5, has been provided and is responsive to a predetermined value of output voltage for generator 128 to close switch contactor 172 only when the generator output voltage and hence the operating speed of the mill has reached a predetermined value, substantially above thread speed. The curve chart of Fig. 8 shows this, such that the integrating device 24 is not operative until the generator output voltage, and hence the speed of the mill, reaches a predetermined value, as shown by the dotted curve. The solid curve shows the theoretical optimum permissible gain for stable operation of the mill. The dotted curve shows the actual gain provided as a reasonable compromise.

The switch contacts 174, 176 and 178 are suitably interconnected with the contact arm of the potentiometer 108, such that the switch contact 178 is closed and switch contacts 174 and 176 are opened when the contact arm of the potentiometer 108 is moved to or below a mill thread speed controlling position. This results in setting the contact arm of potentiometer 122 in its zero signal position when the contact arm of the potentiometer 108 is moved to or above mill thread speed controlling position, the switch contacts 174 and 176 are closed and switch contact 178 is opened. This applies the integrated error control signal to the control windings of the respective stand magnetic amplifier devices. However, before the switch contact 178 closes, and upon the closing of switch contacts 174 and 176, the integrator device 24 applies a zero value error correction signal to these control windings.

If the strip gauge error should go to extremes, there is danger that the corrective action taken by varying the strip tension could possibly cause a breakage of the strip 12 or an undesirable loop of the strip 12 between adjacent stands of the rolling mill or between the fifth stand 38 and the delivery reel 16. To prevent these possibilities the corrective action taken by adjusting the strip tension is arbitrarily limited to approximately plus or minus 5% of the normal voltage setting used at any location along the length of the strip 12 within the rolling mill. This limit is established by an error limiting circuit device 154 which will not allow the error corrective voltage fed into the reference circuit by the impedance devices 64 and 66 to exceed approximately plus or minus 30 volts for the fifth stand as an example. Should this arbitrary plus or minus 30 volt limit be reached, the automatic screw-down jog circuit including the magnetic contactor device 144 is energized.

The actual circuit arrangement of the voltage limiter device including the rectifier bridge 154 and the adjustable potentiometer 155 is believed to be a well known type of limiter or bias panel, and is shown in Fig. 7. It is operative such that at slightly before the maximum desired output error corrective signal of 30 volts, or in other words, at approximately plus or minus 28 volts, one of the relay devices as controlled by the "down" relay winding 149 or the "up" relay winding 150 is energized and operates the jogging circuit including the magnetic contactor device 144 to operate the screw-down motor 136 and to move the upper roller member 140 in the required direction to correct the thickness error as sensed by radiation gauge 18, such that the output voltage across the impedance members 64 and 66 drops to a value below 15 volts, as controlled by the operation of the "up" or "down" relay devices, or substantially one-half the maximum allowed voltage as determined by the voltage limiting circuit. When the output voltage across the impedance devices 64 and 66 drops to a value below 15 volts, the operation of the screw-down jogging circuit is stopped by the operative "up" or "down" relay device dropping out and the remaining correction in strip thickness as may be required is accomplished by the proportional system and the integration system as previously described.

The automatic screw-down jogging circuit includes a plurality of well known time delay relays which are operative such that when their control winding is deenergized, the relay contacts drop out after a predetermined time delay which for the relay devices 1 and 3 is in the order of 0.5 second and for the relay devices 2 and 4 is in the order of two seconds. The relay winding 3 is initially energized to thereby close the contactors $3_1$ and $3_2$. When the error correction signal across impedance devices 64 and 66 has a value above plus or minus 28 volts and of a polarity to energize the "down" control winding 149, the contactor $D_1$, which is normally closed, opens and the contactors $D_2$ and $D_3$ close. The closing of contactor $D_2$ energizes the relay device 4 to open the contactor 4 in series with the relay device 3 to now deenergize the relay device 3, since contactor $D_1$ is now opened. The closing of contactor $D_3$ energizes the down control winding 147 of the magnetic contactor device 144 to operate the constant voltage screw-down motor 136, by providing a suitable polarity energization of the armature circuit, in the down direction to decrease the spacing between the roller members 140 and 142 until the relay device 3 times out in 0.5 second to thereby open the contactors $3_1$ and $3_2$. The opening of the contactor $3_1$ causes the relay device 4 to time out for approximately two seconds. When the relay device 4 has timed out, this closes the contactor 4 in series with the relay device 3 to again energize the relay device 3 which, in turn, reenergizes the relay device 4 and recycles the operation as long as the relay control winding 149 is energized by an error corrective signal across the impedance devices 64 and 66 greater than the approximately 15 volt drop-out level of the down relay device as controlled by the down relay control winding 149. When the down relay device drops out, the jogging operation stops.

The operation of the automatic screw-down jogging circuit to increase the spacing between the roller members 140 and 142 is similar when the "up" relay control winding 150 is energized. Only in this event, the up control winding 151 of the well known magnetic contactor device is alternately energized to operate the screw-down motor 136 in a direction to increase the spacing between the roller members 140 and 142 such that the screw-down motor 136 is operated for a time period of approximately 0.5 second and is not operative for a time period of approximately two seconds and then is reoperative for a time period of 0.5 second and so on, with the control circuit recycling itself as long as the "up" relay control winding 150 is energized by a voltage greater than approximately 15 volts.

The jogging operation in either of the directions to increase the spacing between the roller members 140 and 142 or to decrease the spacing between these roller members is continuous until a voltage out of the fifth stand magnetic amplifier device 62 as applied across the impedance members 64 and 66 becomes less than approximately plus or minus 15 volts, at which time the one of the "up" or "down" relay control windings 149 or 150 that had been operated, dependent upon whether the actual thickness of the strip 12 was greater than or less than the predetermined desired thickness, drops out, and the proportional and integrating control systems take over the remaining necessary corrective actions to bring the strip 12 back to the predetermined desired gauge. In this respect, the automatic screw-down jogging circuit including the magnetic contactor device 144 may be operative only with the fifth stand of the rolling mill and only with the output control signal from the fifth stand magnetic amplifier device 62. In this regard, a voltage limiting device may be provided for the output of each of the magnetic amplifier devices for each of the respective stands. However, the automatic jogging may occur only relative to the output control signal from the fifth stand magnetic amplifier device.

It should be here noted that most of the magnetic amplifier stages have been arranged in push-pull relationship as shown in Fig. 4, and have a considerable amount of negative feedback provided in order to give increased stability and linearity of the output signal.

It should be here noted that the present control apparatus is intended to be operative, if desired, with the control apparatus as shown and described in copending patent applications Serial No. 651,512, filed April 8, 1957, and Serial No. 651,387, filed April 8, 1957, by the same inventors and assigned to the same assignee as the present application.

Although the present invention has been described with a certain degree of particularity, it should be understood that the present disclosure has been made only by way of example and that numerous changes in the details of construction and the combination and arrangement of parts may be resorted to without departing from the scope and the spirit of the present invention. In this regard, it is to be understood that the strip thickness control apparatus as described in the present application is intended to be added to or combined with the presently well known rolling mill control apparatus for the respective stands and winding reels as already well known to persons skilled in this art.

We claim as our invention:

1. In control apparatus for a rolling mill including a first device having a pair of roller members between which a strip of material may be positioned and a second device for pulling on the strip in a direction away from said first device, the combination of a motor operatively connected to one of said first device and said second device for controlling the tension of said strip between the first device and the second device, a strip thickness control device for providing a first control signal which varies as a predetermined function of the thickness of said strip, a motor control device responsive to said first control signal and operatively connected to said motor for controlling the tension of said strip between said first device and said second device in accordance with the variations of said first control signal, and an integrator device responsive to said first control signal for providing a second control signal which varies as a predetermined function of the variations in said first control signal, with said motor control device being responsive to said second control signal for controlling the tension of said strip between said first device and said second device in accordance with the variations of said second control signal.

2. In control apparatus for a first device having a pair of cooperating members between which a strip of material may be positioned and a second device operative with said strip to provide a predetermined tension in said strip between said first and second devices, the combination of a motor member operatively connected to one of said first device and said second device for controlling the tension of said strip between the first and second devices to thereby control the thickness of said strip, a strip thickness measurement device for providing a first control signal which varies as a function of the difference between the actual thickness of said strip and a predetermined strip thickness, a first control device responsive to said first control signal and operative with said motor member for controlling the tension of said strip as a predetermined function of said strip thickness difference, and a second control device responsive to said first control signal for providing a second control signal which varies as a function of the magnitude of said first control signal, with said second control device being operative with said motor member for controlling the tension of said strip as a function of the variations of said second control signal.

3. In control apparatus for a rolling mill including a first device having a pair of roller members between which a strip of material may be positioned and a second device for pulling on the strip in a direction away from said first device, the combination of a motor operatively connected to one of said first device and said second device for controlling the tension of said strip between the first device and the second device, a strip thickness control device for providing a first control signal which varies as a predetermined function of the thickness of said strip, a motor control device responsive to said first control signal and operatively connected to said motor for controlling the tension of said strip between said first device and said second device in accordance with the variations of said first control signal, an integrator device responsive to said first control signal for providing a second control signal which varies as a predetermined function of the variations in said first control signal, with said motor control device being responsive to said second control signal for controlling the tension of said strip between said first device and said second device in accordance with the variations of said second control signal, and a strip tension limiting device operative with said motor control device for limiting the strip tension to a predetermined maximum tension value.

4. In control apparatus for a first device operative with a strip of material for determining the thickness of said strip and a second device operative with said strip to provide a tension in said strip between said first and second devices, the combination of a motor member operative with at least one of said first and second devices for controlling the tension of said strip between said first and second devices, a strip thickness control device for providing a first control signal that has a first polarity when the actual strip thickness is greater than a predetermined strip thickness and has a second polarity when the actual strip thickness is less than said predetermined strip thickness, a first motor control device operative with said motor member for controlling the operating speed of said motor member, said first motor control device being responsive to said first control signal for increasing the motor member speed when said first control signal has said first polarity and for decreasing the motor member speed when the first control signal has said second polarity, and a second motor control device responsive to said first control signal for providing a second control signal that has a first polarity when said first control signal has said first polarity and has a second polarity when said second control signal has said second polarity, with said second motor control being operative with said motor member for controlling the operative speed of said motor member, such that the motor member speed is increased when said second control signal has said first polarity and is decreased when the second control signal has said second polarity.

5. In control apparatus for a first device operative with a strip of material for determining the thickness of said strip and a second device operative with said strip to provide a tension in said strip between said first and second devices, the combination of a motor member operative with at least one of said first and second devices for controlling the tension of said strip between said first and second devices, a strip thickness control device for providing a first control signal that has a first polarity when the actual strip thickness is greater than a predetermined strip thickness and a second polarity when the actual strip thickness is less than said predetermined strip thickness, a first motor control device operative with said motor member for controlling the tension of said strip between said first and second devices, with said first motor control device being responsive to said first control signal for increasing the latter said strip tension when the first control signal has a first of said polarities and decreasing the latter said strip tension when the first control signal has the second of said polarities, and a second motor control device responsive to said first control signal for providing a second control signal that has first and second polarities respectively when said first control signal has said first polarity or said second polarity, with said second motor control device being operative with said motor member for controlling the tension of said strip between said first and second devices such that the latter said strip tension is increased when said second control signal has said first polarity and is decreased when the second control signal has said second polarity, such that the latter said strip tension is increased by each of said first control signal having said first polarity and second control signal having said first polarity and is decreased by each of said first control signal having said second polarity and second control signal having said second polarity.

6. In control apparatus for a first device operative with a strip of material for determining the thickness of said strip and a second device operative with said strip to provide a tension in said strip between said first and second devices, the combination of a motor member operative with at least one of said first and second devices for controlling the tension of said strip between said first and second devices, a strip thickness control device for providing a first control signal that has one polarity when the actual strip thickness is greater than a predetermined strip thickness and another polarity when the actual strip thickness is less than said predetermined strip thickness, a first motor control device operative with said motor member for controlling the operative speed of said motor member, with said first motor control device being responsive to said first control signal for increasing the motor member speed when the first control signal has said one polarity and decreasing the motor member speed when the first control signal has said another polarity, and a second motor control device responsive to said first control signal for providing a second control signal that has one or another polarity respectively when said first control signal has said one polarity or said another polarity, with said second motor control device being operative with said motor member for controlling the operative speed of said motor member such that said motor member speed is increased when said second control signal has said one polarity and is decreased when the second control signal has said another polarity, such that said motor speed is increased by either one of said first control signal and said second control signal having said one polarity and is decreased by either one of said first control signal and said second control signal having said another polarity.

7. In control apparatus for a first device operative with a strip of material for determining the thickness of said strip and a second device operative with said strip to provide a predetermined tension in said strip between said first and second devices, the combination of a motor member operative with at least one of said first and second devices for controlling the tension of said strip between said first and second devices, a strip thickness control device for providing a first control signal that has one polarity when the actual strip thicknesss is greater than a predetermined strip thickness and another polarity when the actual strip thickness is less than said predetermined strip thickness, a first motor control device operative with said motor member for controlling the operative speed of said motor member, with said first motor control device being responsive to said first control signal for increasing the motor member speed when the first control signal has said one polarity and decreasing the motor member speed when the first control signal has said another polarity, and a second motor control device responsive to said first control signal for providing a second control signal that has one polarity and another polarity respectively when said first control signal has said one polarity and said another polarity, with said second motor control device being operative with said motor member for controlling the operative speed of said motor member such that said motor member speed is increased when said second control signal has said one polarity and is decreased when the second control signal has said another polarity, and a strip tension limiting device operative with one of said motor control devices for limiting the total corrective change made to said motor member speed and thereby limiting the maximum tension of said strip between said first and second devices.

8. In control apparatus for a rolling mill including a plurality of stands, with each of said stands having a pair of roller members between which a strip of material may be positioned, the combination of a plurality of motors, with each of said motors being operative with one of said stands for controlling the tension of said strip relative to its respective stand, a strip thickness control device positioned in a predetermined location relative to said rolling mill for providing a first control signal that varies as a predetermined function of the thickness of said strip at said location, a plurality of motor control devices, with each of said motor control devices being operative with one of said motors and being responsive to said first control signal for controlling the operation of its respective motor in accordance with the variations of said first control signal, a signal integration device responsive to said first control signal for providing a second control signal that varies as a predetermined function of the variations of said first control signal, with each of said motor control devices being responsive to said second control signal for controlling the operation of its respective motor in accordance with the variations of said second control signal.

9. In control apparatus for a rolling mill including a plurality of stands successively operative to determine the thickness of a continuous strip of material, with each of said stands having a pair of roller members between which the strip of material may be positioned, the combination of a plurality of motors, with each of said motors being operative with one of said stands for controlling the tension of said strip relative to its respective stand, a strip thickness control device positioned relative to said rolling mill to provide a first control signal that varies as a predetermined function of the thickness of the strip leaving the last of said stands, a signal integration device responsive to said first control signal for providing a second control signal that varies as a predetermined function of the variations of said first control signal, a plurality of motor control devices, with each of said motor control devices being operative with one of said motors and being responsive to said first control signal and to said second control signal for controlling the operation of its respective motor in accordance with the variations of said first control signal and the variations of said second control signal, with each of said motor control devices being operative to control the operation of its respective motor as a predetermined function of the distance between its respective motor and said strip thickness control device such that the motor located the greatest distance away from said strip thickness control device has its operation controlled the least by said first and second control signals and the motor located the closest distance away from said strip thickness control device has its operation controlled the greatest by said first and second control signals, with the intermediate motors being controlled in varying amounts in accordance with the distance between each respective motor and said thickness control device.

References Cited in the file of this patent
UNITED STATES PATENTS

| | | |
|---|---|---|
| 2,155,860 | Hudson | Apr. 25, 1939 |
| 2,264,096 | Mohler | Nov. 25, 1941 |
| 2,295,399 | Hanna | Sept. 8, 1942 |

OTHER REFERENCES

Continuous Gaging, Automation, March 1956 (pages 52 to 57).